US012145454B2

(12) United States Patent
Sommansson et al.

(10) Patent No.: US 12,145,454 B2
(45) Date of Patent: Nov. 19, 2024

(54) APPARATUS AND A METHOD FOR DISCHARGING A CAPACITOR

(71) Applicant: Scania CV AB, Södertälje (SE)

(72) Inventors: Joakim Sommansson, Grödinge (SE); Jens Gustavsson, Strängnäs (SE); Oscar Hällman, Södertälje (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 18/025,201

(22) PCT Filed: Aug. 27, 2021

(86) PCT No.: PCT/SE2021/050837
§ 371 (c)(1),
(2) Date: Mar. 8, 2023

(87) PCT Pub. No.: WO2022/060273
PCT Pub. Date: Mar. 24, 2022

(65) Prior Publication Data
US 2023/0322086 A1    Oct. 12, 2023

(30) Foreign Application Priority Data

Sep. 15, 2020  (SE) .................................... 2051075-6

(51) Int. Cl.
*B60L 3/00*      (2019.01)
*B60R 16/023*    (2006.01)
(Continued)

(52) U.S. Cl.
CPC .......... *B60L 3/0046* (2013.01); *B60R 16/023* (2013.01); *H02J 7/00032* (2020.01); *H02J 7/345* (2013.01)

(58) Field of Classification Search
CPC ...... B60L 3/00; H02J 7/34; H02J 7/00; B60R 16/023
See application file for complete search history.

(56) References Cited

U.S. PATENT DOCUMENTS 9,041,361 B2    5/2015   Viancino et al.
9,231,414 B2    1/2016   Viancino et al.
(Continued)

FOREIGN PATENT DOCUMENTS

| CN | 110233509 A     | 9/2019 |
| CN | 110803025 A     | 2/2020 |
| IT | 201800007859 A1 | 2/2020 |

OTHER PUBLICATIONS

Scania CV AB, International Patent Application No. PCT/SE2021/050837, International Preliminary Report on Patentability, Mar. 21, 2023.

(Continued)

*Primary Examiner* — Jared Fureman
*Assistant Examiner* — Esayas G Yeshaw
(74) *Attorney, Agent, or Firm* — Moore & Van Allen PLLC; W. Kevin Ransom

(57) ABSTRACT

A method for discharging a capacitor. An active discharge circuit is connected in parallel with the capacitor. An interface provides a signal connection between a message-based communication system and the active discharge circuit. The interface comprises at least one input for receiving messages from the message-based communication system. The interface comprises a wake-up functionality. The at least one input comprises an input for the wake-up functionality. The method comprises: receiving at the input for the wake-up functionality a disable discharge command message of said messages for the disabling of the discharge of the capacitor, wherein upon cessation of the disable discharge command message the discharge of the capacitor is enabled. An apparatus for the discharge of a capacitor, wherein the apparatus comprises the interface and the active discharge circuit connectable in parallel with the capacitor.

24 Claims, 6 Drawing Sheets

(51) Int. Cl.
*H02J 7/00* (2006.01)
*H02J 7/34* (2006.01)

(56) References Cited

U.S. PATENT DOCUMENTS

| | | | |
|---|---|---|---|
| 11,296,596 B1* | 4/2022 | Kim | H02M 3/156 |
| 2012/0081022 A1* | 4/2012 | Moussakov | H05B 45/44 |
| | | | 315/240 |
| 2013/0035819 A1 | 2/2013 | Wolft | |
| 2013/0207458 A1* | 8/2013 | Viancino | B60L 3/0069 |
| | | | 307/10.1 |
| 2015/0130273 A1 | 5/2015 | Govindaraj et al. | |
| 2016/0365801 A1* | 12/2016 | Phadke | H02M 1/34 |
| 2017/0355267 A1 | 12/2017 | Zhou et al. | |
| 2018/0069478 A1* | 3/2018 | Phadke | H02M 3/33507 |
| 2020/0189395 A1 | 6/2020 | Takahashi | |
| 2020/0244093 A1 | 7/2020 | Loy-Lafond | |
| 2021/0268910 A1 | 9/2021 | Simonazzi et al. | |

OTHER PUBLICATIONS

Scania CV AB, International Patent Application No. PCT/SE2021/050837, International Search Report, Oct. 27, 2021.
Scania CV AB, International Patent Application No. PCT/SE2021/050837, Written Opinion, Oct. 27, 2021.
Scania CV AB, Swedish Patent Application No. 2051075-6, Office Action, Apr. 14, 2021.
Scania CV AB, European Patent Application No. 21869854.6, Extended European Search Report, Sep. 18, 2024.

\* cited by examiner

APPARATUS AND A METHOD FOR DISCHARGING A CAPACITOR

CROSS-REFERENCE TO RELATED APPLICATIONS

This application is a National Stage Patent Application (filed under 35 § U.S.C. 371) of PCT/SE2021/050837, filed Aug. 27, 2021, of the same title, which, in turn claims priority to Swedish Patent Application No. 2051075-6 filed Sep. 15, 2020, of the same title; the contents of each of which are hereby incorporated by reference.

FIELD OF THE INVENTION

Aspects of the present invention relate to a method for discharging a capacitor. Aspects of the present invention also relate to an apparatus for the discharge of a capacitor.

BACKGROUND OF THE INVENTION

In general, electrical devices, such as electronic components, electrically connected to an electrical system, may be equipped with one or more capacitors as an electrical buffer. This may, for example, be the case for electrical devices connected to an electrical system of a vehicle, such as a hybrid vehicle or an electric vehicle. An electrical system of a vehicle, which be referred to as a vehicle electrical system, or a vehicle high voltage system (VCB), may be electrically connected, or connectable, to the electric battery or electric batteries of the vehicle, which may be provided as one or more electric battery packs. For example, a vehicle electrical system may transfer electric power or electric current between various electrical devices or units included in the vehicle, for example the hybrid vehicle or the electric vehicle. A vehicle electrical system may transfer electric power or electric current from the electric battery to the electric motor/motors driving, or propelling, the vehicle. In some cases, occasionally the above-mentioned capacitor should be discharged, for example for safety reasons.

SUMMARY OF THE INVENTION

The inventors of the present invention have found drawbacks in conventional solutions for discharging a capacitor. For example, the communication or control system assigned to control the discharge of the capacitor may require additional cable, or wire, harness to implement the control or management of the discharge of the capacitor.

An object of the invention is to provide a solution which mitigates or solves the drawbacks and problems of conventional solutions.

The above and further objects are solved by the subject matter of the independent claims. Further advantageous embodiments of the invention can be found in the dependent claims.

According to a first aspect of the invention, the above mentioned and other objects are achieved with a method for discharging a capacitor,
wherein an active discharge circuit is connected in parallel with the capacitor,
wherein an interface provides a signal connection between a message-based communication system and the active discharge circuit,
wherein the interface comprises at least one input for receiving messages from the message-based communication system,
wherein the interface comprises a wake-up functionality,
wherein the at least one input comprises an input for the wake-up functionality,
wherein the method comprises:
receiving at the input for the wake-up functionality a disable discharge command message of said messages for the disabling of the discharge of the capacitor,
wherein upon cessation of the disable discharge command message the discharge of the capacitor is enabled.

The capacitor may be included in, or part of, an electrical circuit included in, or part of, or electrically connected to, an electrical device electrically connected to an electrical system. In some embodiments, the at least one input of the interface may comprise a plurality of inputs, i.e. two or more inputs, for receiving messages from the message-based communication system. Thus, the interface may comprise a plurality of inputs for receiving messages from the message-based communication system.

An advantage of the method according to the first aspect is that an interface, which is associated with a message-based communication system and which already has an input for the wake-up functionality, does not need to be equipped with any additional input specifically for the receipt of disable discharge command messages and the control of the active discharge circuit and of the discharge of the capacitor. Further, without the need to add an additional input for the control of the discharge of the capacitor, less cable harness is needed, and consequently, cables and space for cable harness are saved. Thus, the interface and/or the communication system is/are simplified, and the efficiency of the interface and the communication system is improved. Consequently, the efficiency of the discharge functionality is improved.

When many or several electrical devices, each electrical device having a capacitor, are to be connected to an electrical system, even more additional cable harnesses to implement the control of the discharge of all the capacitors would be required in conventional solutions. Thus, in these cases, i.e. when many capacitors are present, the innovative method according to the first aspect further improves the simplification and/or the efficiency of the interface and the communication system, since even less cable harnesses are needed in relation to conventional solutions, and consequently, even more cables and even more space for cable harnesses are saved in relation to conventional solutions. Thus, in these cases, i.e. when many capacitors are present, the efficiency of the discharge of capacitors is further improved by way of the method according to the first aspect.

An advantage of the method according to the first aspect is that less electric power, or electric energy, is consumed by the interface and/or the communication system since there is no need to wake up or activate any electric control unit, ECU, for the control of the active discharge circuit and the control of the discharge of the capacitor, wherein the activation of the electric control unit, ECU, would consume more electric power. Consequently, the efficiency of the interface and the communication system is improved also for this reason, and the efficiency of the discharge functionality is improved.

As defined above, the interface is configured to receive messages from the message-based communication system. However, it is to be understood that the message-based communication system may also be configured to receive messages outputted to the message-based communication system, for example outputted by the interface. The message-based communication system may be referred to as a message-based protocol communication system. It may be defined that the message-based communication system is based on message passing. With regard to communication systems, message passing may be described as a technique where an entity sends a message to a process, for example, and that process selects and runs some appropriate code. Message passing may be described as being different from conventional programming where a process, subroutine, or function is directly invoked by name. Said message may also be referred to as a frame. Thus, the message-based communication system may also be referred to as a frame-based communication system.

An active discharge circuit is a device that actively executes the discharge of the capacitor, for example by way of a resistor and a switch connected in series and then both connected in parallel with the capacitor to be provided with the discharge functionality, wherein the switch is switched to turn on or turn off the discharge of the capacitor. In contrast to the active discharge circuit, there is the passive discharge circuit, which in general includes a resistor (a bleeder resistor), often with a high resistance value, connected in parallel with the capacitor to be provided with the discharge functionality, but without any switch. A passive discharge circuit is constantly discharging the capacitor to a certain degree. In general, an active discharge circuit is more attractive than a passive discharge circuit since the use of an active discharge circuit reduces the losses in the system when the capacitor is in active use.

The wake-up functionality is disclosed in further detail in the detailed described hereinbelow.

According to an advantageous embodiment of the method according to the first aspect, the method comprises:
  ceasing to receive the disable discharge command message at the input for the wake-up functionality so as to enable the discharge of the capacitor.

An advantage of this embodiment is that the efficiency of the interface and the communication system is further improved. Consequently, the efficiency of the discharge functionality is further improved.

According to a further advantageous embodiment of the method according to the first aspect, the interface comprises an output for signals to the active discharge circuit,
  wherein the method comprises:
    in response to the receipt of the disable discharge command message at the input for the wake-up functionality, outputting at the output a disable discharge signal for the disabling of the discharge of the capacitor.

An advantage of this embodiment is that the efficiency of the interface and the communication system is further improved. Consequently, the efficiency of the discharge functionality is further improved.

According to another advantageous embodiment of the method according to the first aspect, the method comprises:
  in response to the cessation of the disable discharge command message, outputting at the output an enable discharge signal for the enabling of the discharge of the capacitor.

An advantage of this embodiment is that the efficiency of the interface and the communication system is further improved. Consequently, the efficiency of the discharge functionality is further improved.

According to yet another advantageous embodiment of the method according to the first aspect, the method comprises:
  upon the output of a disable discharge signal from the output, triggering a timer circuit to start timing, whereupon a time period of the timer circuit starts running, during the time period, repeating the disable discharge signal to the active discharge circuit by way of the timer circuit, and
  on expiry of the time period, ceasing to repeat the disable discharge signal to the active discharge circuit by way of the timer circuit.

An advantage of this embodiment is that the control of the discharge of the capacitor is further improved. Consequently, the efficiency of the discharge functionality is further improved.

According to another advantageous embodiment of the method according to the first aspect, the signal connection between the message-based communication system and the active discharge circuit goes through the timer circuit. An advantage of this embodiment is that the control of the discharge of the capacitor is further improved. Consequently, the efficiency of the discharge functionality is further improved.

According to still another advantageous embodiment of the method according to the first aspect, the method comprises:
  by way of the waking-up functionality, waking up, or activating, the interface to process the disable discharge command message only, for the disabling and/or enabling of the discharge of the capacitor.

An advantage of this embodiment is that the electric power consumption of the interface and/or the communication system is further reduced. Thus, the efficiency of the interface and the communication system is further improved. Consequently, the efficiency of the discharge functionality is further improved.

According to an advantageous embodiment of the method according to the first aspect, the active discharge circuit comprises
  a resistive component, and
  a discharge switch,
    wherein the resistive component and the discharge switch are connected in series, and
    wherein the interface provides a signal connection between the message-based communication system and the discharge switch.

According to a further advantageous embodiment of the method according to the first aspect, the discharge switch comprises a control terminal for selectively closing and opening the discharge switch, wherein the interface provides a signal connection between the message-based communication system and the control terminal of the discharge switch.

According to another advantageous embodiment of the method according to the first aspect, the interface provides a signal connection between the output of the interface and the control terminal of the discharge switch.

According to yet another advantageous embodiment of the method according to the first aspect, the input for the wake-up functionality comprises an input pin. An advantage of this embodiment is that an interface, which is associated with a message-based communication system and which already has an input pin for the wake-up functionality, does not need to be equipped with any additional input pin specifically for the receipt of disable discharge command messages and the control of the active discharge circuit and of the discharge of the capacitor. Without the need to add an additional input pin for the control of the discharge of the capacitor, less cable harness is needed, and consequently, cables and space for cable harness are saved. Thus, the interface and the communication system are simplified, and the efficiency of the interface and the communication system is further improved. Consequently, the efficiency of the discharge functionality is further improved. When many electrical devices, each electrical device having a capacitor, are to be connected to an electrical system, even more additional input pins and even more additional cable harnesses to implement the control of the discharge of all the capacitors would be required in conventional solutions. Thus, in these cases, i.e. when many capacitors are present, this embodiment further improves the simplification and/or the efficiency of the interface and the communication system, since even less cable harnesses are needed in relation to conventional solutions, and consequently, even more cables and even more space for cable harnesses are saved in relation to conventional solutions. Thus, in these cases, i.e. when many capacitors are present, the efficiency of the discharge of capacitors is further improved by way of this embodiment.

According to still another advantageous embodiment of the method according to the first aspect, the output of the interface comprises an output pin.

According to an advantageous embodiment of the method according to the first aspect, the interface comprises a transceiver,
wherein the transceiver provides the signal connection between the message-based communication system and the active discharge circuit,
wherein the transceiver comprises the at least one input for receiving messages from the message-based communication system, and
wherein the transceiver comprises the wake-up functionality.

An advantage of this embodiment is that an efficient implementation of the interface is provided. Consequently, the efficiency of the discharge functionality is further improved.

According to a further advantageous embodiment of the method according to the first aspect, the transceiver comprises the output of the interface.

According to another advantageous embodiment of the method according to the first aspect, the method comprises:
by way of the waking-up functionality, waking up, or activating, the transceiver to process the disable discharge command message, for the disabling and/or enabling of the discharge of the capacitor, without waking up, or without activating, any central processing unit, CPU, and/or any electronic control unit, ECU.

An advantage of this embodiment is that the electric power consumption of the interface, which in this embodiment includes the transceiver, and/or the communication system is further reduced. Thus, the efficiency of the interface and the communication system is further improved. Consequently, the efficiency of the discharge functionality is further improved.

According to a further advantageous embodiment of the method according to the first aspect, the transceiver is a controller area network, CAN, transceiver. An advantage of this embodiment is that the efficiency of the interface and the communication system is further improved. Consequently, the efficiency of the discharge functionality is further improved.

However, in alternative embodiments, the transceiver may be a transceiver associated with, or configured to be applied to, any other message-based communication system, for example a local interconnect network, LIN, communication system, or an Ethernet communication system. However, the transceiver may also be configured to be applied to other message-based communication systems.

According to another advantageous embodiment of the method according to the first aspect, the message-based communication system is a vehicle-internal communication system. The innovative control of the discharge functionality is advantageous for vehicles and the message-based communication systems for vehicles, whereby an efficient discharge functionality with regard to the capacitor is provided.

According to still another advantageous embodiment of the method according to the first aspect, the message-based communication system is a controller area network, CAN, protocol communication system. An advantage of this embodiment is that the efficiency of the interface and the communication system is further improved. Consequently, the efficiency of the discharge functionality is further improved. However, in alternative embodiments, the message-based communication system may be any another message-based communication system, for example a local interconnect network, LIN, communication system, or an Ethernet communication system.

According to another advantageous embodiment of the method according to the first aspect, the interface is a controller area network, CAN, interface, and wherein each input of the at least one input is configured to receive controller area network, CAN, protocol messages. An advantage of this embodiment is that the efficiency of the interface and the communication system is further improved. Consequently, the efficiency of the discharge functionality is further improved. However, in alternative embodiments, the interface may be an interface associated with, or configured to be applied to, any other message-based communication system, for example a local interconnect network, LIN, communication system, or an Ethernet communication system. However, the interface may also be configured to be applied to other known message-based communication systems. Correspondingly, in alternative embodiments, each input of the at least one input may be configured to receive any other message according to any other protocol, for example a local interconnect network, LIN, protocol message, or an Ethernet protocol message. Said message may be referred to as a frame. Thus, for example, the controller area network, CAN, protocol message may be referred to as a controller area network, CAN, protocol frame.

According to yet another advantageous embodiment of the method according to the first aspect, the capacitor is included in an electrical circuit, wherein the electrical circuit comprises a direct current link comprising the capacitor. The innovative control of the discharge functionality is advantageous for a direct current link capacitor, whereby an efficient discharge functionality with regard to the capacitor is provided.

According to still another advantageous embodiment of the method according to the first aspect, the capacitor is included in, or part of, an electrical circuit included in, or part of, or electrically connected to, an electrical device electrically connected to an electrical system, wherein the electrical system is electrically connected to one or more electric batteries. The innovative control of the discharge functionality is advantageous for an electrical system provided with one or more electric batteries, whereby an efficient discharge functionality with regard to the capacitor is provided. Each electric battery of the one or more electric battery may be a high voltage electric battery.

According to an advantageous embodiment of the method according to the first aspect, the capacitor is included in, or part of, an electrical circuit included in, or part of, or electrically connected to, an electrical device electrically connected to an electrical system, wherein the electrical system comprises a vehicle electrical system of a vehicle. The innovative control of the discharge functionality is advantageous for vehicles and the electrical systems for vehicles, whereby an efficient discharge functionality with regard to the capacitor is provided.

According to a second aspect of the invention, the above mentioned and other objects are achieved with an apparatus for the discharge of a capacitor, wherein the apparatus comprises
   an active discharge circuit connectable in parallel with the capacitor, and
   an interface for providing a signal connection between a message-based communication system and the active discharge circuit,
   wherein the interface comprises at least one input for receiving messages from the message-based communication system,
   wherein the interface comprises a wake-up functionality,
   wherein the at least one input comprises an input for the wake-up functionality,
   wherein the interface is configured to receive at the input for the wake-up functionality a disable discharge command message of said messages for the disabling of the discharge of the capacitor, and
   wherein upon cessation of the disable discharge command message the discharge of the capacitor is enabled.

The capacitor may be included in, or part of, an electrical circuit included in, or part of, or electrically connectable to, an electrical device electrically connectable to an electrical system. As mentioned above, the at least one input of the interface may comprise a plurality of inputs, i.e. two or more inputs, for receiving messages from the message-based communication system.

The advantages of the apparatus according to the second aspect and the advantages of the embodiments of the apparatus according to the second aspect mentioned hereinafter correspond to the above- or below-mentioned advantages of the method according to the first aspect and its embodiments, and are thus not repeated.

According to an advantageous embodiment of the apparatus according to the second aspect, the interface is configured to cease receiving the disable discharge command message at the input for the wake-up functionality so as to enable the discharge of the capacitor.

According to a further advantageous embodiment of the apparatus according to the second aspect, the interface comprises an output, or two or more outputs, for signals to the active discharge circuit,
   wherein the interface is configured to, in response to the receipt of the disable discharge command message at the input for the wake-up functionality, output at the output, i.e. at the output of the interface, a disable discharge signal for the disabling of the discharge of the capacitor.

According to another advantageous embodiment of the apparatus according to the second aspect, the interface is configured to, in response to the cessation of the disable discharge command message, output at the output, i.e. at the output of the interface, an enable discharge signal for the enabling of the discharge of the capacitor.

According to still another advantageous embodiment of the apparatus according to the second aspect, the apparatus comprises a timer circuit configured to, upon the output of a disable discharge signal from the output, be triggered to start timing, whereupon a time period of the timer circuit starts running,
   wherein the timer circuit is configured to, during the time period, repeat the disable discharge signal to the active discharge circuit, and
   wherein the timer circuit is configured to, on expiry of the time period, cease repeating the disable discharge signal to the active discharge circuit.

A timer circuit configured as stated above may be designed in several different ways.

According to yet another advantageous embodiment of the apparatus according to the second aspect, the interface is configured to provide a signal connection between the message-based communication system and the active discharge circuit through the timer circuit.

According to an advantageous embodiment of the apparatus according to the second aspect, the interface is configured to, by way of the waking-up functionality, wake up (or be activated) to process the disable discharge command message only, for the disabling and/or enabling of the discharge of the capacitor.

According to a further advantageous embodiment of the apparatus according to the second aspect, the active discharge circuit comprises
   a resistive component, and
   a discharge switch,
   wherein the resistive component and the discharge switch are connected in series, and
   wherein the interface is configured to provide a signal connection between the message-based communication system and the discharge switch.

The resistive component may comprise one or more resistors.

According to another advantageous embodiment of the apparatus according to the second aspect, the discharge switch comprises a control terminal for selectively closing and opening the discharge switch, and wherein the interface is configured to provide a signal connection between the message-based communication system and the control terminal of the discharge switch.

According to yet another advantageous embodiment of the apparatus according to the second aspect, the interface is configured to provide a signal connection between the output of the interface and the control terminal of the discharge switch.

According to still another advantageous embodiment of the apparatus according to the second aspect, the input for the wake-up functionality comprises an input pin.

According to an advantageous embodiment of the apparatus according to the second aspect, the output of the interface comprises an output pin.

According to a further advantageous embodiment of the apparatus according to the second aspect, the interface comprises a transceiver,
   wherein the transceiver is configured to provide the signal connection between the message-based communication system and the active discharge circuit,
   wherein the transceiver comprises the at least one input for receiving messages from the message-based communication system, and
   wherein the transceiver comprises the wake-up functionality.

According to another advantageous embodiment of the apparatus according to the second aspect, the transceiver comprises the output of the interface.

According to still another advantageous embodiment of the apparatus according to the second aspect, the transceiver is configured to, by way of the waking-up functionality, wake up, or be activated, to process the disable discharge command message, for the disabling and/or enabling of the discharge of the capacitor, without waking up, or without activating, any central processing unit, CPU, and/or any electronic control unit, ECU.

According to another advantageous embodiment of the apparatus according to the second aspect, the transceiver is a controller area network, CAN, transceiver.

According to a further advantageous embodiment of the apparatus according to the second aspect, the message-based communication system is a vehicle-internal communication system.

According to still another advantageous embodiment of the apparatus according to the second aspect, the message-based communication system is a controller area network, CAN, protocol communication system.

According to a further advantageous embodiment of the apparatus according to the second aspect, the interface is a controller area network, CAN, interface, wherein each input of the at least one input is configured to receive controller area network, CAN, protocol messages.

According to yet another advantageous embodiment of the apparatus according to the second aspect, the capacitor is included in an electrical circuit, wherein the electrical circuit comprises a direct current link comprising the capacitor.

According to an advantageous embodiment of the apparatus according to the second aspect, the capacitor is included in, or part of, an electrical circuit included in, or part of, or electrically connectable to, an electrical device electrically connectable to an electrical system, wherein the electrical system is electrically connectable to one or more electric batteries, for example one or more battery packs suitable for vehicles. As mentioned above, each electric battery of the one or more electric battery may be a high voltage electric battery.

According to a further advantageous embodiment of the apparatus according to the second aspect, the capacitor is included in, or part of, an electrical circuit included in, or part of, or electrically connectable to, an electrical device electrically connectable to an electrical system, wherein the electrical system comprises a vehicle electrical system of a vehicle. The vehicle electrical system may be configured for direct current. The vehicle electrical system may be a vehicle high voltage system of a vehicle. The vehicle high voltage system may be configured for a voltage above 60 V, for example above 400 V, such as above 650 V. For example, the vehicle high voltage system may be configured for a voltage up to 1500 V.

According to another advantageous embodiment of the apparatus according to the second aspect, the apparatus comprises the capacitor, wherein the active discharge circuit is connected in parallel with the capacitor.

According to still another advantageous embodiment of the apparatus according to the second aspect, the apparatus comprises the message-based communication system, for example the controller area network, CAN, protocol communication system.

According to a third aspect of the invention, the above mentioned and other objects are achieved with vehicle high voltage system comprising one or more apparatuses according to any one of the above- or below-mentioned embodiments.

The vehicle high voltage system may be configured for direct current. The vehicle high voltage system may be configured for a high voltage, such as a voltage above 60 V, for example above 400 V, such as above 650 V. For example, the vehicle high voltage system may be configured for a voltage up to 1500 V. As mentioned above, the vehicle high voltage system may be electrically connectable to one or more electric batteries, for example one or more battery packs suitable for vehicles.

The advantages of the vehicle high voltage system according to the third aspect correspond to the above- or below-mentioned advantages of the apparatus according to the first aspect and its embodiments. The vehicle high voltage system may be, or may be referred to as, a VCB.

According to a fourth aspect of the invention, the above mentioned and other objects are achieved with a vehicle comprising one or more of the group of:
an apparatus according to any one of the above- or below-mentioned embodiments; and
a vehicle high voltage system according to any one of the above- or below-mentioned embodiments.

The advantages of the vehicle according to the fourth aspect correspond to the above- or below-mentioned advantages of the apparatus according to the first aspect and its embodiments.

The vehicle may be a wheeled vehicle, i.e. a vehicle having wheels. The vehicle may for example be a bus, a tractor vehicle, a heavy vehicle, a truck, or a car. However, other types of vehicles are possible. The vehicle may be referred to as a motor vehicle. The vehicle may be an electric vehicle, EV, for example a hybrid vehicle or a hybrid electric vehicle, HEV, or a battery electric vehicle, BEV.

The above-mentioned features and embodiments of the method, the apparatus, the vehicle high voltage system and the vehicle, respectively, may be combined in various possible ways providing further advantageous embodiments.

Further advantageous embodiments of the method, the apparatus, the vehicle high voltage system and the vehicle according to the present invention and further advantages with the embodiments of the present invention emerge from the detailed description of embodiments.

BRIEF DESCRIPTION OF THE DRAWINGS

Embodiments of the invention will now be illustrated, for exemplary purposes, in more detail by way of embodiments and with reference to the enclosed drawings, where similar references are used for similar parts, in which.

DETAILED DESCRIPTION

Figure 1:
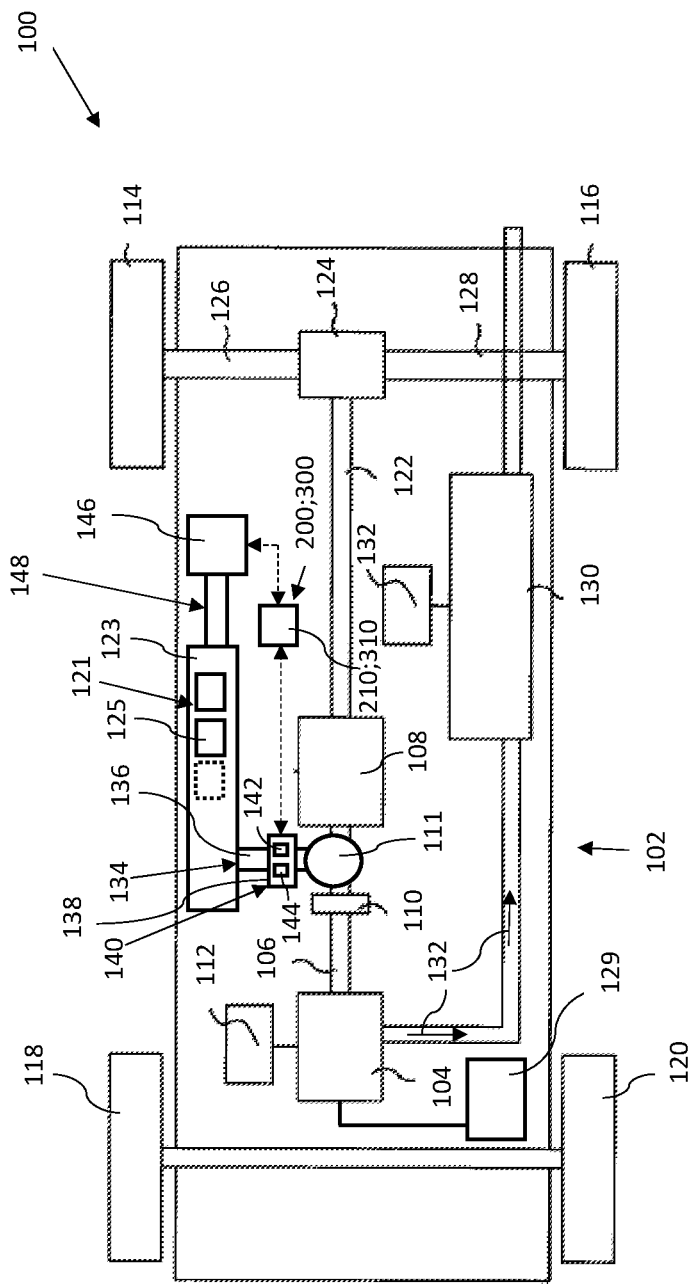
FIG. 1 is a schematic view illustrating an embodiment of the vehicle according to the fourth aspect of the invention, in which embodiments of the present invention may be implemented.

With reference to FIG. 1, a vehicle 100 is schematically illustrated. The vehicle 100 may be called a motor vehicle 100. In embodiments, the vehicle 100 may, for example, be a car, a bus, a tractor vehicle, a truck, for example a heavy truck, for example provided with a trailer. Other types of vehicles are possible.

With reference to FIG. 1, the vehicle 100 comprises a powertrain 102, which in the shown embodiment comprises a combustion engine 104, for example an internal combustion engine or another combustion engine, which in a conventional manner, via a first output shaft 106 and usually via a flywheel, may be connected to a gearbox 108 via a clutch 110. In general, the combustion engine 104 comprises cylinders.

In addition to the powertrain 102 comprising a combustion engine 104, the vehicle 100 may include one or more electric motors 111, or electrical machines, for driving drive wheels 114, 116, 118, 120 of the vehicle 100 and may thus, for example, be a so-called hybrid vehicle. The electric motor 111, or electrical machine, may be provided with electric power from an electrical energy unit 121, which may be included in the vehicle 100. The electrical energy unit 121 may include an electric battery unit 123 or a plurality of electric battery units 123, which also may be referred to as electric battery packs. The battery unit 123 may include one or more electric batteries 125. Thus, the electric battery 125 may be configured to power, i.e. to provide electric power to, the electrical motor 111. It is to be understood that each of the electric battery 125 may comprises a plurality of electric battery cells. Electric batteries 125, electric battery packs and electric battery cells are known to the skilled person and thus not described in further detail.

However, instead of the powertrain 102 comprising a combustion engine 104, the vehicle 100 may include only an electric motor 111, or only electric motors 111, for driving the drive wheels 114, 116, 118, 120 of the vehicle 100, i.e. excluding the combustion engine 104, whereby the vehicle 100 may be a pure electrical vehicle. Thus, according to embodiments, the vehicle 100 may be an electric vehicle, EV, for example a hybrid vehicle or a hybrid electric vehicle, HEV, or a battery electric vehicle, BEV.

With reference to FIG. 1, the combustion engine 104 is controlled by the engine's control system via a control device 112. Likewise, the clutch 110 and the gearbox 108 may be controlled by the engine's control system, with the help of one or more control devices (not shown). The control device 112 and/or another control device may thus be configured to control the combustion engine 104, the clutch 110, the gearbox 108, and/or any other units/devices/entities of the vehicle 100. However, in FIG. 1, only a small selection of the units/devices/entities of the vehicle 100 is illustrated.

Naturally, the powertrain 102 of the vehicle 100 may be of a different type, such as a type with a conventional automatic gearbox, a type with a hybrid driveline, or a type with a driveline for a pure electrical vehicle, etc. As mentioned above, the powertrain 102 may include one or more electric motors 111, or electrical machines, for driving the drive wheels 114, 116, 118, 120 of the vehicle 100, implementing a so-called hybrid drive. In the shown embodiment, the vehicle 100 comprises four wheels 114, 116, 118, 120, but may have more wheels. The electric motor 111, or electrical machine, may be arranged essentially anywhere, as long as torque is provided to one or more of the wheels 114, 116, 118, 120, for example adjacent to one or more of the wheels 114, 116, 118, 120, or along a propeller shaft 122 of the vehicle 100, for example between the gearbox 108 and the clutch 110, as is understood by a skilled person.

With reference to FIG. 1, the vehicle 100 may comprise a propeller shaft 122 from the gearbox 108 which drives two of the wheels 114, 116 via a central gear 124, for example a conventional differential, and two drive shafts 126, 128 of the vehicle 100. The two drive shafts 126, 128 are connected to the central gear 124. The vehicle 100 may comprise a fuel tank 129 coupled to the combustion engine 104, and the combustion engine 104 may be provided with fuel from the fuel tank 129.

With reference to FIG. 1, the vehicle 100 may comprise an exhaust gas after-treatment system 130 for treatment/purification of an exhaust gas/emissions of an exhaust gas stream 132 (indicated with arrows) from the combustion engine 104. The exhaust gas/emissions is/are the result of the combustion in the combustion chamber of the combustion engine 104. The exhaust gas after-treatment system 130 may also be called an exhaust gas purification system.

With reference to FIG. 1, the vehicle 100 may include one or more electrical systems 134, for example a vehicle electrical system 136, electrically connectable to one or more electric batteries 125. The electrical system 134 or the vehicle electrical system 136 may be configured to electrically connect the electric battery 125 to the electric motor 111. The vehicle electrical system 136 may be, or referred to as, a vehicle high voltage system (VCB) 136. The electrical system 134 may be configured for direct current, DC. Thus, the vehicle electrical system 136 may be configured for direct current.

Thus, vehicle high voltage system 136 may be electrically connected or coupled, or connectable, to one or more electric batteries 125 and/or one or more electric battery packs of the vehicle 100. The electric power, or the electric current, for example the direct current, of the vehicle high voltage system 136 is transferred at a high voltage, for example above 60 V, such as above 400 V, or above 650 V. The electric power, or the electric current, of the vehicle high voltage system 136 may be transferred at a voltage up to 1500 V. Thus, the vehicle high voltage system 136 may be configured for a high voltage, such as a voltage above 60 V, for example above 400 V, or above 650 V. For example, the vehicle high voltage system 136 may be configured for a voltage up to 1500 V.

With reference to FIG. 1, the electric battery 125 may be electrically connected or coupled to the electric motor 111 via an inverter 138 in ways known to the skilled person. The inverter 138, for example called power inverter 138, may be referred to as an electrical device 140. In embodiments, the inverter 138 may be integrated into the electric motor 111 or be external thereto. Thus, the electrical device 140 or the inverter 138 may be electrically connectable, or connected or coupled, to the electrical system 134 or the vehicle electrical system 136. The electrical device 140, for example the inverter 138, may comprise or be electrically connected, or connectable, to an electrical circuit 142, which may comprise a capacitor 150 (see FIGS. 2 and 4), for example provided to act, or function, as an electrical buffer. In the shown embodiment, the electrical circuit 142 may be called a direct current link 142. Expressed alternatively, the electrical circuit 142 may comprise a direct current link 142 comprising the capacitor 150. In the shown embodiment, the capacitor 150 may be called a direct current link capacitor. Further, an active discharge circuit 144 may be provided. The active discharge circuit 144 may be connectable, or connected, in parallel with the capacitor 150 (see FIG. 2) in order to discharge the capacitor 150 at a certain occasion or at certain occasions. For example, it may be desirable to have the capacitor 150 discharged when the vehicle 100 is turned off and parked to hinder that users or personal may come into contact with a charged capacitor, to prevent a possible fire, and/or to avoid heating.

With reference to FIG. 1, the vehicle 100 may be provided with at least one electronic control unit, ECU, 146. In general, the vehicle 100 may be provided with a plurality of electronic control units, ECUs. Each electronic control unit, ECU, 146 may be configured to control a part or various parts, for example one or more electrical devices, of the vehicle 100, for example the electric battery unit 123 holding one or more electric batteries 125. The electric battery unit 123 may be referred to as a direct current, DC, power source. The electronic control unit, ECU, 146 may be connected to the electrical device 140 or devices 140, for example the electric battery unit 123, which the electronic control unit, ECU, 146 is configured to control, via a message-based communication system 148. Thus, the electronic control unit, ECU, 146 may communicate with the electrical devices 140 via the message-based communication system 148.

Figure 2:
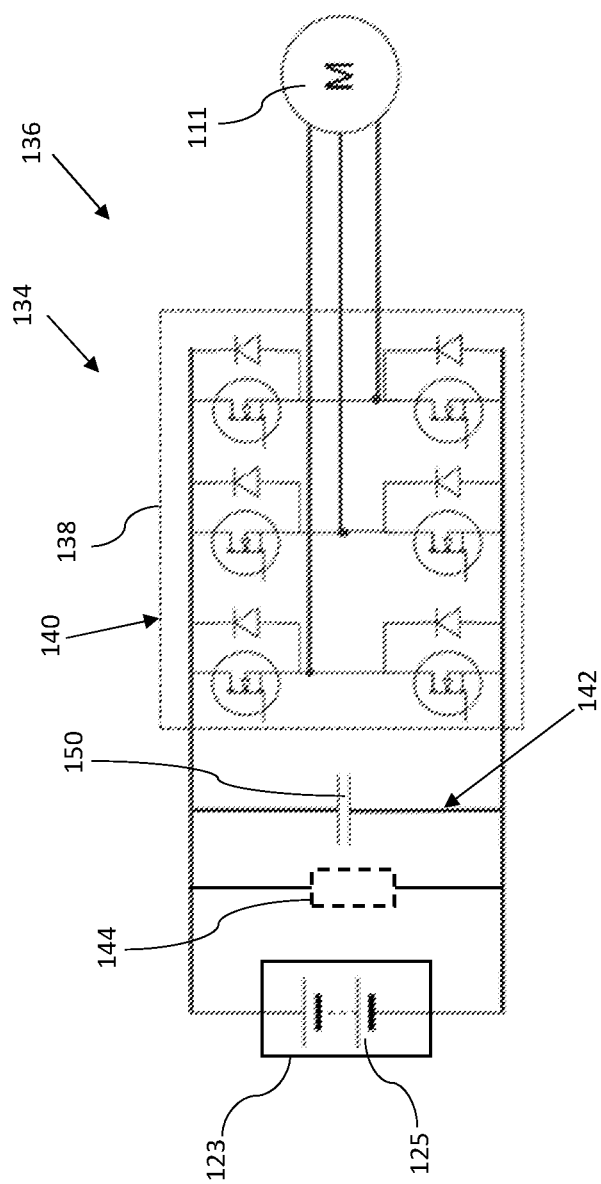
FIG. 2 is a schematic diagram illustrating a configuration to which an embodiment of the method according to the first aspect of the invention and an embodiment of the apparatus according to the second aspect of the invention can be applied.

With reference to FIG. 2, it is schematically illustrated how one or more electric batteries 125 are electrically connected to an electric motor 111, for example an electric motor 111 of a vehicle 100. The electric battery 125 is connected to the electric motor 111 via a power inverter 138. An electrical circuit 142, which comprises a capacitor 150, is electrically connected, or connectable, or included in the power inverter 138, which may be referred to as an electrical device 140. In other embodiments, the electrical device 140 may be, or comprise, some other component or device instead of a power inverter 138.

With reference to FIG. 2, in the shown embodiment, the electrical circuit 142 may be referred to as a direct current link. In the shown embodiment, the capacitor 150 may be referred to as a direct current link capacitor. In the shown embodiment, the capacitor 150 is located between the electric battery unit 123 holding the electric batteries 125 and the power inverter 138. In the shown embodiment, the purpose of the capacitor 150 may be to provide a more stable direct current, DC, voltage, for example minimizing voltage dips as the power inverter 138 sporadically demands heavy current. Provided is also an active discharge circuit 144, which may correspond to the active discharge circuit 202 and 302 disclosed in further detail herein below. As shown in FIG. 2, the active discharge circuit 144 is connected, or connectable, in parallel with the capacitor 150. The configuration schematically illustrated in FIG. 2, which connects the electric battery 125 to the electric motor 111, may be referred to as an electrical system 134 or a vehicle electrical system 136. In other embodiments, the electrical system 134 may have other configurations. For example, the electrical system 134 or the vehicle electrical system 136 may comprise less or more items, or elements, than what is illustrated in FIG. 2.

Figure 3:
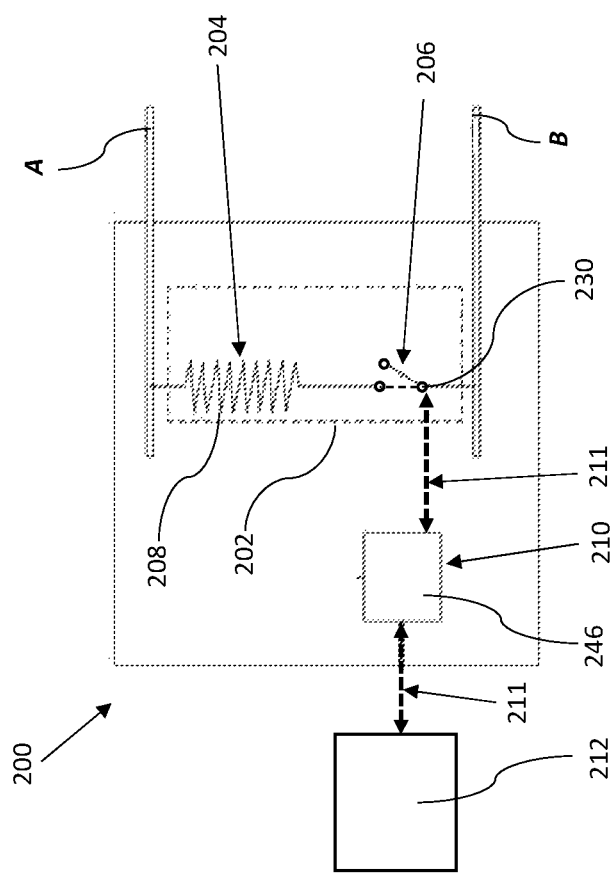
FIG. 3 is a schematic diagram illustrating a first embodiment of the apparatus according to the second aspect of the invention.

With reference to FIG. 3, a first embodiment of the apparatus 200 for the discharge of a capacitor, for example the capacitor 150 shown in FIG. 2, according to the second aspect is schematically illustrated. The capacitor 150 may be included in an electrical circuit 142 included in, or electrically connectable to, an electrical device 140 electrically connectable to an electrical system 134, 136. The apparatus 200 includes an active discharge circuit 202 connectable in parallel with the capacitor 150. More specifically, it may be defined that the active discharge circuit 202 is electrically connectable in parallel with the capacitor 150. The active discharge circuit 202 may be connectable in parallel with the capacitor 150 via position A and position B indicated in FIG. 3. Thus, when the active discharge circuit 202 is connected or coupled to the capacitor 150, the capacitor 150 is positioned between the position A and position B and is connected to position A and position B, wherein the position A may represent a plus or positive (+) position and the position B may represent a minus or negative (−) position of the apparatus 200.

With reference to FIG. 3, the active discharge circuit 202 may include a resistive component 204 and a discharge switch 206. The resistive component 204 and the discharge switch 206 are connected in series with one another. More specifically, it may be defined that the resistive component 204 and the discharge switch 206 are electrically connected in series. The resistive component 204 may comprise one or more resistors 208. The discharge switch 206 may comprise any one of a MOSFET switch and an IGBT switch. However, other types of switches for the discharge switch 206 are possible.

With reference to FIG. 3, the apparatus 200 further includes an interface 210 for providing a signal connection 211 between a message-based communication system 212 and the active discharge circuit 202. For example, the message-based communication system 212 may correspond to the message-based communication system 148 schematically illustrated in FIG. 1. However, other configurations of the message-based communication system 212 are possible. The message-based communication system 212 may be connectable to one or more electric control units, ECUs, for example included in a vehicle 100, for example as illustrated in FIG. 1. It may be defined that the interface 210 is configured to be connected or coupled, directly or indirectly, to the active discharge circuit 202. It may be defined that the interface 210 is configured to, directly or indirectly, communicate with the active discharge circuit 202. More specifically, the interface 210 may be configured to provide a signal connection 211 between the message-based communication system 212 and the discharge switch 206 of the active discharge circuit 202.

Figure 5:
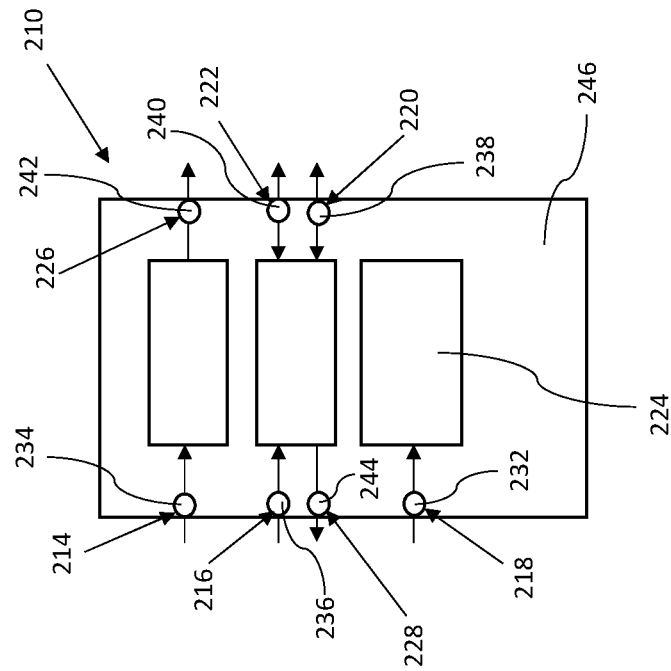
FIG. 5 is a schematic block diagram illustrating an embodiment of the interface of embodiments of the apparatus according to the second aspect of the invention.

With reference to FIG. 5, which in a more detailed view schematically illustrates an embodiment of the interface 210. The interface 210 comprises at least one input 214, 216, 218, 220, 222, for example a plurality of inputs 214, 216, 218, 220, 222, i.e. two or more inputs 214, 216, 218, 220, 222, for receiving messages from the message-based communication system 212. Thus, in some embodiments, the at least one input 214, 216, 218, 220, 222 may comprise a plurality of inputs 214, 216, 218, 220, 222 for receiving messages from the message-based communication system. The interface 210 comprises a wake-up functionality 224, or wake-up function, which is disclosed in further detail hereinbelow. The wake-up functionality 224 may include, or be referred to as, a selective wake-up functionality. The at least one input 214, 216, 218, 220, 222, for example the plurality of inputs 214, 216, 218, 220, 222, of the interface 210 includes an input 218 for the wake-up functionality 224. In addition to the wake-up functionality 224, the interface 210 may include additional functionalities.

With reference to FIGS. 3 and 5, the interface 210 is configured to receive at the input 218 for the wake-up functionality 224 a disable discharge command message of said messages, i.e. the messages from the message-based communication system 212, for the disabling of the discharge of the capacitor 150. Upon cessation of the disable discharge command message, the discharge of the capacitor 150 is enabled. Expressed alternatively, the cessation of the disable discharge command message enables the discharge of the capacitor 150. Thus, as long as a disable discharge command message is received at the at the input 218 for the wake-up functionality 224, the discharge of the capacitor 150 is blocked, inactivated or disabled, and when the disable discharge command message is no longer received by the interface 210, the discharge of the capacitor 150 is enabled or activated.

With reference to FIGS. 3 and 5, the interface 210 may be configured to cease receiving the disable discharge command message at the input 218 for the wake-up functionality 224 so as to enable the discharge of the capacitor 150. The interface 210 may include an output 226 for signals to the active discharge circuit 202, for example, more specifically to the discharge switch 206. In addition to the output 226 for signals to the active discharge circuit 202, the interface 210 may comprise additional outputs 220, 222, 228 for the output of signals or messages, for example to the message-based communication system 212. Thus, the interface 210 may comprise a plurality of outputs 220, 222, 226, 228, i.e. two or more outputs 220, 222, 226, 228.

With reference to FIGS. 3 and 5, the interface 210 may be configured to, in response to the receipt of the disable discharge command message at the input 218 for the wake-up functionality 224, output at the output 226, i.e. at the output 226 for signals to the active discharge circuit 202, a disable discharge signal for the disabling of the discharge of the capacitor 150, or for the blocking of the discharge of the capacitor 150. Expressed alternatively, the interface 210 may be configured to, in response to the receipt of the disable discharge command message at the input 218 for the wake-up functionality 224, send a disable discharge signal for the disabling of the discharge of the capacitor 150 from the output 226, i.e. from the output 226 for signals to the active discharge circuit 202, to the active discharge circuit 202, for example, more specifically to the discharge switch 206. Further, the interface 210 may be configured to, in response to the cessation of the disable discharge command message, output at the output 226, i.e. at the output 226 for signals to the active discharge circuit 202, an enable discharge signal for the enabling of the discharge of the capacitor 150.

With reference to FIG. 3, the discharge switch 206 may comprise a control terminal 230 for selectively closing and opening the discharge switch 206, or for selectively turning the discharge switch 206 on and off, wherein the interface 210 may be configured to provide a signal connection 211 between the message-based communication system 212 and the control terminal 230 of the discharge switch 206. The interface 210 may be configured to provide a signal connection 211 between the output 226, i.e. the output 226 for signals to the active discharge circuit 202, of the interface 210 and the control terminal 230 of the discharge switch 206.

With reference to FIG. 3, it may be defined that the discharge switch 206 is electrically operable. It may be defined that the discharge switch 206 is switchable between an open position and a closed position, or operable between an off-state or on-state. In FIG. 3, the discharge switch 206 is illustrated in the open position while the closed positions of the discharge switch 206 is illustrated by a dotted line in FIG. 3. With reference to FIG. 3, more specifically, it may be defined that the interface 210 is configured to perform a logical inversion of the disable discharge command message received from the message-based communication system 212, for example disclosed as follows: When the disable discharge command message has a high logic level, the disable discharge signal outputted from the interface 210, for example from the output 226, i.e. the output 226 for signals to the active discharge circuit 202, to the control terminal 230 of the discharge switch 206 has a low voltage level so that the discharge switch 206 is in the open position, i.e. the discharge of the capacitor 150 is disabled, i.e. the capacitor 150 is not discharged. It may be defined that the output 226 for signals to the active discharge circuit 202 is connected to the active discharge circuit 202, more specifically to the discharge switch 206, or even more specifically to the control terminal 230 of the discharge switch 206. It may be defined that when the disable discharge command message has a high logic level, the output 226, i.e. the output 226 for signals to the active discharge circuit 202, has a low voltage level so that the discharge switch 206 is in the open position. When the disable discharge command message from the message-based communication system 212 ceases, i.e. drops to a low logic level, the enable discharge signal outputted from the interface 210, for example from the output 226, i.e. the output 226 for signals to the active discharge circuit 202, to the control terminal 230 of the discharge switch 206 has a high voltage level, i.e. a voltage sufficient, to switch the discharge switch 206 to the closed position, i.e. the discharge of the capacitor 150 is enabled, i.e. the capacitor 150 is discharged. It may be defined that when the disable discharge command message has a low logic level, the output 226, i.e. the output 226 for signals to the active discharge circuit 202, has a high voltage level, i.e. voltage sufficiently high, to switch the discharge switch 206 to the closed position.

It may be defined that when the discharge switch 206 is in the closed position, the discharge switch 206 is configured to conduct an electric current or allow an electric current to pass. It may be defined that when the discharge switch 206 is in the open position, the discharge switch 206 is configured to interrupt an electric current or an electric current path therethrough.

With reference to FIGS. 3 and 5, the interface 210 may be configured to, by way of the waking-up functionality 224, wake up (or be activated) to process the disable discharge command message (received from the message-based communication system 212) only, for the disabling and/or enabling of the discharge of the capacitor 150, for example without waking up (without activating) any central processing unit, CPU, and/or any electronic control unit, ECU.

With reference to FIG. 5, the input 218 for the wake-up functionality 224 may comprise an input pin 232. Further, each of the other inputs 214, 216, 220, 222 of the plurality of inputs 214, 216, 218, 220, 222 may comprise an input pin 234, 236, 238, 240. The output 226 of the interface 210, i.e. the output 226 for signals to the active discharge circuit 202, may comprise an output pin 242. The output 226 for signals to the active discharge circuit 202, which may comprise an output pin 242, may be referred to as an inhibit output or inhibit output pin. Further, each of the additional outputs 220, 222, 228 may comprise an output pin 238, 240, 244.

With reference to FIGS. 3 and 5, the interface 210 may comprise a transceiver 246. The transceiver 246 may thus be configured to provide the signal connection 211 between the message-based communication system 212 and the active discharge circuit 202, for example, more specifically between the message-based communication system 212 and the discharge switch 206, or even more specifically between the message-based communication system 212 and the control terminal 230 of the discharge switch 206.

When the interface 210 comprises the transceiver 246, the transceiver 246 comprises the at least one input 214, 216, 218, 220, 222, for example the plurality of inputs 214, 216, 218, 220, 222, for receiving messages from the message-based communication system 212. When the interface 210 comprises the transceiver 246, the transceiver 246 comprises the wake-up functionality 224. When the interface 210 comprises the transceiver 246, the transceiver 246 may comprise the output 226 of the interface 210, i.e. the output 226 for signals to the active discharge circuit 202. When the interface 210 comprises the transceiver 246, the transceiver 246 may be configured to, by way of the waking-up functionality 224, wake up (or be activated) to process the disable discharge command message received from the message-based communication system 212, for the disabling and/or enabling of the discharge of the capacitor 150, without waking up any central processing unit, CPU, and/or any electronic control unit, ECU.

With reference to FIGS. 1 and 3, the message-based communication system 212 may be a vehicle-internal communication system 148.

Figure 4:
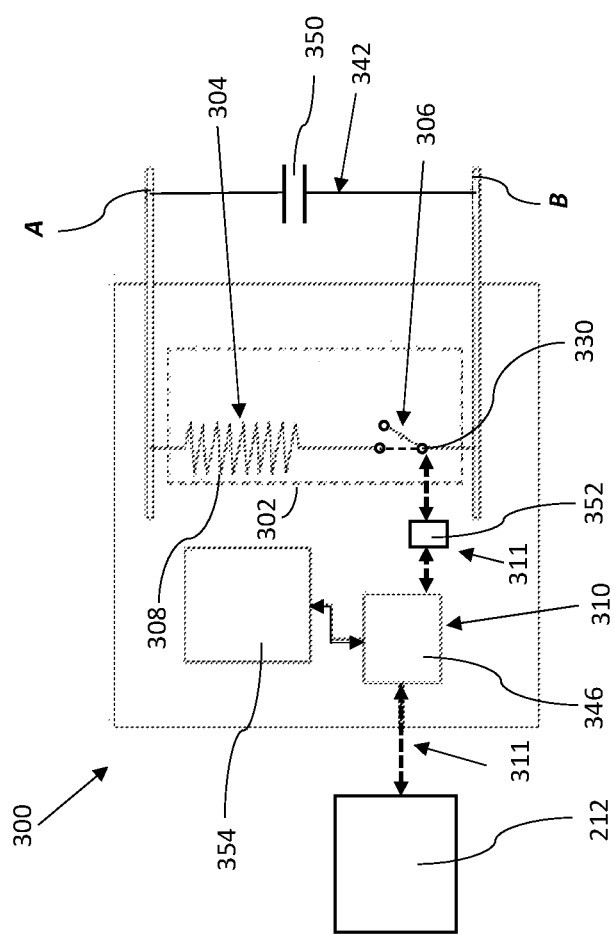
FIG. 4 is a schematic diagram illustrating a second embodiment of the apparatus according to the second aspect of the invention.

With reference to FIG. 4, a second embodiment of the apparatus 300 for the discharge of a capacitor, for example the capacitor 150 shown in FIG. 2 or the capacitor 350 included in electrical circuit 342 present in FIG. 4, according to the second aspect is schematically illustrated. The second embodiment of the apparatus 300 shown in FIG. 4 corresponds in several aspects to the first embodiment of the apparatus 200 shown in FIG. 3, so only some of the differences between the second embodiment and the first embodiment will be mentioned herein in detail.

However, with reference to FIG. 4, as for the first embodiment of the apparatus 200 according to second first aspect, the second embodiment of the apparatus 300 of FIG. 4 also, in a corresponding manner, includes an active discharge circuit 302, which may include a resistive component 304 and a discharge switch 306. The active discharge circuit 302 may be connectable in parallel with the capacitor 350 via position A and position B indicated in FIG. 4. Thus, when the active discharge circuit 302 is connected or coupled to the capacitor 350, the capacitor 350 is positioned between position A and position B and is connected to the position A and the position B of the apparatus 300. The resistive component 304 may comprise one or more resistors 308. In a corresponding way, the apparatus 300 includes an interface 310 for providing a signal connection 311 between the message-based communication system 212 and the active discharge circuit 302. The interface 310 may essentially correspond to the interface 210 illustrated in FIG. 5. In corresponding way, the discharge switch 306 may comprise a control terminal 330 for selectively closing and opening the discharge switch 306.

With reference to FIG. 4, the apparatus 300 may include a timer circuit 352 configured to, upon the output of a disable discharge signal from the output 226 (i.e. the output 226 for signals to the active discharge circuit 302), be triggered to start timing, whereupon a time period of the timer circuit 352 starts running. The timer circuit 352 is configured to, during the time period, repeat the disable discharge signal to the active discharge circuit 302. The timer circuit 352 is configured to, on expiry of the time period, cease repeating the disable discharge signal to the active discharge circuit 302. The interface 310 may be configured to provide a signal connection 311 between the message-based communication system 212 and the active discharge circuit 302 through, or via, the timer circuit 352. It may be defined that the signal connection 311 between the message-based communication system 212 and the active discharge circuit 302 comprises the timer circuit 352. Thus, it may be defined that the output 226 for signals to the active discharge circuit 302 is connected to timer circuit 352, and that the timer circuit 352 is connected to the active discharge circuit 302, more specifically to the discharge switch 306, or even more specifically to the control terminal 330 of the discharge switch 306. A timer circuit 352 per se, which includes the above-mentioned features, may be designed in several different ways.

With reference to FIG. 4, the apparatus 300 may include a central processing unit, CPU, 354, which based on messages from the message-based communication system 212 and received by the interface 310 is configured to process the messages and output control signals for controlling various different electrical units or devises. The central processing unit, CPU, 354 is not necessary for the applications of the disclosed innovative embodiments of the apparatus 200, 300 according to the second aspect. The first embodiment of the apparatus 200 illustrated in FIG. 3 may also be provided with such a central processing unit, CPU. In embodiments of the apparatus according to the second aspect, the central processing unit, CPU, 354 schematically illustrated in FIG. 4 may be excluded while the timer circuit 352 may be maintained.

With reference to FIGS. 3 and 4, according to some embodiments, each of the apparatuses 200, 300 may include the capacitor 150, 350, wherein the active discharge circuit 202, 302 may be connected in parallel with the capacitor 150, 350. Further, according to some embodiments, each of the apparatuses 200, 300 may include the message-based communication system 212.

With reference to FIGS. 1, 3 and 4, the message-based communication system 148, 212 may be referred to as a message-based protocol communication system. It may be defined that the message-based communication system 148, 212 is based on message passing. As mentioned above, with regard to communication systems, message passing may be described as a technique where an entity sends a message to a process, for example, and that process selects and runs some appropriate code. Message passing may be described as being different from conventional programming where instead a process, subroutine, or function is directly invoked by name. Said message may also be referred to as a frame. Thus, the message-based communication system may be referred to as a frame-based communication system.

The message-based communication system 148, 212 may be a controller area network, CAN, protocol communication system. However, in alternative embodiments, the message-based communication system 148, 212 may be another message-based communication system, for example a local interconnect network, LIN, communication system, or an Ethernet communication system.

With reference to FIGS. 1 and 3 to 5, the interface 210, 310 may be a controller area network, CAN, interface, wherein each input 214, 216, 218, 220, 222 of the at least one input 214, 216, 218, 220, 222, for example of the plurality of inputs 214, 216, 218, 220, 222, is configured to receive controller area network, CAN, protocol messages. However, in alternative embodiments, the interface 210, 310 may be an interface associated with, or configured to be applied to, any other message-based communication system, for example a local interconnect network, LIN, communication system, or an Ethernet communication system. However, the interface 210, 310 may also be configured to be applied to other message-based communication systems. Correspondingly, in alternative embodiments, each input 214, 216, 218, 220, 222 of the at least one input 214, 216, 218, 220, 222, for example of the plurality of inputs 214, 216, 218, 220, 222, of the interface 210, 310 may be configured to receive any other message according to any other protocol, for example a local interconnect network, LIN, protocol message, or a Ethernet protocol message. For example, the controller area network, CAN, protocol message may be referred to as a controller area network, CAN, protocol frame.

With reference to FIGS. 3 to 5, the transceiver 246, 346 may be a controller area network, CAN, transceiver. However, in alternative embodiments, the transceiver 246, 346 may be a transceiver associated with, or configured to be applied to, any other message-based communication system, for example a local interconnect network, LIN, communication system, or an Ethernet communication system. However, the transceiver 246, 236 may also be configured to be applied to other message-based communication systems.

With regard to controller area network, CAN, the controller area network, CAN, interface may be referred to as a controller area network, CAN, protocol interface. The controller area network, CAN, interface may comprise, or be referred to as, a controller area network, CAN, circuit. The controller area network, CAN, circuit may comprise the transceiver.

With regard to controller area network, CAN, the controller area network, CAN, communication system may be described as being based on and/or configured to use or apply the controller area network, CAN, protocol. The controller area network, CAN, protocol communication system may be referred to as a controller area network, CAN, communication system. The controller area network, CAN, protocol communication system may include, or be referred to as, a controller area network, CAN, bus.

With regard to controller area network, CAN, the message from the controller area network, CAN, protocol communication system may be referred to as a controller area network, CAN, protocol message. The controller area network, CAN, protocol message may be referred to as a controller area network, CAN, message or a controller area network, CAN, frame.

With regard to controller area network, CAN, the controller area network, CAN, transceiver may be referred to as a controller area network, CAN, protocol transceiver.

When controller area network, CAN, is present, the wake-up functionality 224 or function, or capability, or mechanism may be referred to as a CAN wake-up functionality, for example selective CAN wake-up functionality. For example, this functionality may be a feature present in some CAN transceivers, and one original use of such a functionality is intended for the waking up a unit, for example an ECU, via a CAN message, hence wake up on CAN. For a version of a wake-up functionality 224, or function, reference is made to ISO 11898-2:2016, which inter alia discloses further details about the wake-up functionality 224 for CAN.

Figure 6:
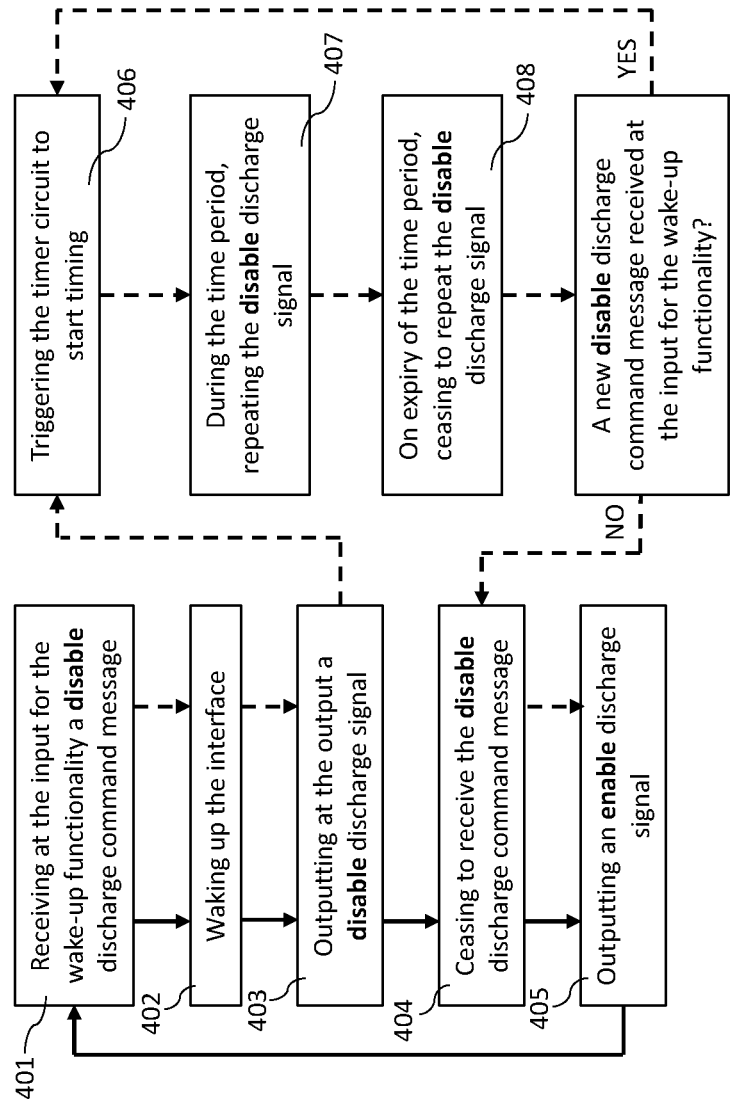
FIG. 6 is a schematic flow chart illustrating aspects of embodiments of the method according to the first aspect of the invention.

With reference to FIG. 6, aspects of embodiments of the method for discharging a capacitor 150, 350, for example a capacitor 150, 350 as disclosed above, are schematically illustrated, wherein an active discharge circuit 202, 302 is connected in parallel with the capacitor 150, 350, wherein an interface 210, 310 provides a signal connection 211, 311 between a message-based communication system 148, 212 and the active discharge circuit 210, 310, wherein the interface 210, 310 comprises at least one input 214, 216, 218, 220, 222 for receiving messages from the message-based communication system 148, 212, wherein the interface 210, 310 comprises a wake-up functionality 224, and wherein the at least one input 214, 216, 218, 220, 222 comprises an input 218 for the wake-up functionality.

Embodiments of the method may include:
receiving 401 at the input 218 for the wake-up functionality 224 a disable discharge command message of said messages for the disabling of the discharge of the capacitor 150, 350 (wherein upon cessation of the disable discharge command message the discharge of the capacitor 150, 350 is enabled);

by way of the waking-up functionality, waking up 402, or activating, the interface 201, 310 to process the disable discharge command message only, for the disabling and/or enabling of the discharge of the capacitor 150, 350;

in response to the receipt 401 of the disable discharge command message at the input 218 for the wake-up functionality 224, outputting 403 at the output 226 a disable discharge signal for the disabling of the discharge of the capacitor 150, 350;

ceasing 404 to receive the disable discharge command message at the input 218 for the wake-up functionality 224 so as to enable the discharge of the capacitor 150, 350;

in response to the cessation 404 of the disable discharge command message, outputting 405 at the output 226 an enable discharge signal for the enabling of the discharge of the capacitor 150, 350.

When a timer circuit 352 is provided, the method may additionally include:
upon the output 403 of a disable discharge signal from the output, triggering 406 the timer circuit 352 to start timing, whereupon a time period of the timer circuit 352 starts running, during the time period, repeating 407 the disable discharge signal to the active discharge circuit 302 by way of the timer circuit 352, and on expiry of the time period, ceasing 408 to repeat the disable discharge signal to the active discharge circuit 302 by way of the timer circuit 352.

The dotted arrows in FIG. 6 illustrate embodiments of the method including the additional steps 406, 407 and 408.

Further, when a transceiver 246, 346 is provided, the method may include:
by way of the waking-up functionality 224, waking up, or activating, the transceiver 246, 346 to process the disable discharge command message, for the disabling and/or enabling of the discharge of the capacitor 150, 350, without waking up any central processing unit, CPU, and/or any electronic control unit, ECU.

Unless disclosed otherwise, it should be noted that the method steps illustrated in FIG. 6 and described herein do not necessarily have to be executed in the order illustrated in FIG. 6. The steps may essentially be executed in any suitable order. Further, one or more steps may be excluded or added without departing from the scope of the appended claims.

With reference to FIGS. 1, 3 and 4, an embodiment of the vehicle high voltage system 136 according to the third aspect of the invention is also schematically illustrated. The vehicle high voltage system 136 may comprise any one of the embodiments of the apparatus 200, 300 disclosed above or below. However, with reference to FIG. 2, the electrical circuit 142 and the capacitor 150 may be located at other locations in the vehicle 100, or outside any vehicle 100 and may be included in, or electrically connectable to, any other electrical device different from the electrical device 140 disclosed above, for example an alternating current, AC, compressor, a heater for heating one or more regions in the vehicle 100, a power inverter different from the power inverter 138 disclosed above, a DC-to-DC converter, a pump, a power take-off unit of any kind etc.

With reference to FIG. 1, an embodiment of the vehicle 100 according to the fourth aspect of the invention is schematically illustrated. The vehicle 100 comprises one or more of the group of: an apparatus 200, 300 according to any one of the above- or below-mentioned embodiments; and a vehicle high voltage system 136 according to any one of the above- or below-mentioned embodiments.

It is to be understood that other applications of the embodiments of the apparatus 200, 300 according to the second aspect and embodiments of the method according to the first aspect, in addition to an application to a vehicle 100 and any other application mentioned above, are possible. It is to be understood that embodiments of the apparatus 200, 300 according to the second aspect and embodiments of the method according to the first aspect may be applied to more than one capacitor.

The present invention is not limited to the above described embodiments. Instead, the present invention relates to, and encompasses all different embodiments being included within the scope of the independent claims.

The invention claimed is:

1. A method for discharging a capacitor,
   wherein an active discharge circuit is connected in parallel with the capacitor,
   wherein an interface provides a signal connection between a message-based communication system and the active discharge circuit,
   wherein the interface comprises at least one input for receiving messages from the message-based communication system,
   wherein the interface comprises a wake-up functionality,
   wherein the at least one input comprises an input for the wake-up functionality,
   wherein the method comprises:
   receiving at the input for the wake-up functionality a disable discharge command message of said messages for the disabling of the discharge of the capacitor;
   wherein upon cessation of the disable discharge command message, enabling a discharge of the capacitor.

2. A method according to claim 1, wherein the method further comprises:
   ceasing to receive the disable discharge command message at the input for the wake-up functionality so as to enable the discharge of the capacitor.

3. A method according to claim 1, wherein the interface comprises an output for signals to the active discharge circuit,
   wherein the method further comprises:
   in response to the receipt of the disable discharge command message at the input for the wake-up functionality, outputting at the output a disable discharge signal for the disabling of the discharge of the capacitor.

4. A method according to claim 3, wherein the method further comprises:
   in response to the cessation of the disable discharge command message, outputting at the output an enable discharge signal for the enabling of the discharge of the capacitor.

5. A method according to claim 3, wherein the method further comprises:
   upon an output of a disable discharge signal from the output, triggering a timer circuit to start timing, whereupon a time period of the timer circuit starts running;
   during the time period, repeating the disable discharge signal to the active discharge circuit by way of the timer circuit; and
   on expiry of the time period, ceasing to repeat the disable discharge signal to the active discharge circuit by way of the timer circuit.

6. A method according to claim 1, wherein the method comprises:
   by way of the waking-up functionality, waking up the interface to process the disable discharge command message only, for the disabling and/or enabling of the discharge of the capacitor.

7. A method according to claim 1, wherein the active discharge circuit comprises:
   a resistive component, and
   a discharge switch,
   wherein the resistive component and the discharge switch are connected in series, and
   wherein the interface provides a signal connection between the message-based communication system and the discharge switch.

8. An apparatus for the discharge of a capacitor, wherein the apparatus comprises:
   an active discharge circuit connectable in parallel with the capacitor; and
   an interface for providing a signal connection between a message-based communication system and the active discharge circuit,
   wherein the interface comprises at least one plurality of inputs for receiving messages from the message-based communication system,
   wherein the interface comprises a wake-up functionality,
   wherein the at least one input comprises an input for the wake-up functionality,
   wherein the interface is configured to:
   receive at the input for the wake-up functionality a disable discharge command message of said messages for the disabling of the discharge of the capacitor, and
   wherein upon cessation of the disable discharge command message, enable the discharge of the capacitor.

9. An apparatus according to claim 8, wherein the interface is configured to cease receiving the disable discharge command message at the input for the wake-up functionality so as to enable the discharge of the capacitor.

10. An apparatus according to claim 8, wherein the interface comprises an output for signals to the active discharge circuit, and
    wherein the interface is configured to, in response to the receipt of the disable discharge command message at the input for the wake-up functionality, output at the output a disable discharge signal for the disabling of the discharge of the capacitor.

11. An apparatus according to claim 10, wherein the interface is configured to, in response to the cessation of the disable discharge command message, output at the output an enable discharge signal for the enabling of the discharge of the capacitor.

12. An apparatus according to claim 10, wherein the apparatus comprises a timer circuit configured to, upon the output of a disable discharge signal from the output, be triggered to start timing, whereupon a time period of the timer circuit starts running,
    wherein the timer circuit is configured to, during the time period, repeat the disable discharge signal to the active discharge circuit, and
    wherein the timer circuit is configured to, on expiry of the time period, cease repeating the disable discharge signal to the active discharge circuit.

13. An apparatus according to claim 12, wherein the interface is configured to provide a signal connection between the message-based communication system and the active discharge circuit through the timer circuit.

14. An apparatus according to claim 8, wherein the interface is configured to, by way of the waking-up functionality, wake up to process the disable discharge command message only, for the disabling and/or enabling of the discharge of the capacitor.

15. An apparatus according to claim 8, wherein the active discharge circuit comprises:
   a resistive component; and
   a discharge switch,
   wherein the resistive component and the discharge switch are connected in series, and
   wherein the interface is configured to provide a signal connection between the message-based communication system and the discharge switch.

16. An apparatus according to claim 15, wherein the discharge switch comprises a control terminal for selectively closing and opening the discharge switch, and wherein the interface is configured to provide a signal connection between the message-based communication system and the control terminal of the discharge switch.

17. An apparatus according to claim 8, wherein the interface comprises a transceiver,
   wherein the transceiver is configured to provide the signal connection between the message-based communication system and the active discharge circuit,
   wherein the transceiver comprises the at least one input for receiving messages from the message-based communication system, and
   wherein the transceiver comprises the wake-up functionality.

18. An apparatus according to claim 17, wherein the transceiver is configured to, by way of the waking-up functionality, wake up to process the disable discharge command message, for the disabling and/or enabling of the discharge of the capacitor, without waking up any central processing unit, CPU, and/or any electronic control unit, ECU.

19. An apparatus according to claim 8, wherein the message-based communication system is a controller area network, CAN, protocol communication system.

20. An apparatus according to claim 8, wherein the interface is a controller area network, CAN, interface, and wherein each input of the at least one input is configured to receive controller area network, CAN, protocol messages.

21. An apparatus according to claim 8, wherein the capacitor is included in an electrical circuit, and wherein the electrical circuit comprises a direct current link comprising the capacitor.

22. An apparatus according to claim 8, wherein the capacitor is included in an electrical circuit included in, or electrically connectable to, an electrical device electrically connectable to an electrical system, and wherein the electrical system comprises a vehicle electrical system of a vehicle.

23. A vehicle high voltage system comprising an apparatus for the discharge of a capacitor, wherein the apparatus comprises:
   an active discharge circuit connectable in parallel with the capacitor; and
   an interface for providing a signal connection between a message-based communication system and the active discharge circuit,
   wherein the interface comprises at least one plurality of inputs for receiving messages from the message-based communication system,
   wherein the interface comprises a wake-up functionality,
   wherein the at least one input comprises an input for the wake-up functionality,
   wherein the interface is configured to:
      receive at the input for the wake-up functionality a disable discharge command message of said messages for the disabling of the discharge of the capacitor, and
      wherein upon cessation of the disable discharge command message, enable the discharge of the capacitor.

24. A vehicle comprising one or more of the group of:
an apparatus for the discharge of a capacitor, wherein the apparatus comprises:
   an active discharge circuit connectable in parallel with the capacitor; and
   an interface for providing a signal connection between a message-based communication system and the active discharge circuit,
   wherein the interface comprises at least one plurality of inputs for receiving messages from the message-based communication system,
   wherein the interface comprises a wake-up functionality,
   wherein the at least one input comprises an input for the wake-up functionality,
   wherein the interface is configured to:
      receive at the input for the wake-up functionality a disable discharge command message of said messages for the disabling of the discharge of the capacitor, and
      wherein upon cessation of the disable discharge command message, enable the discharge of the capacitor; and/or
a vehicle high voltage system comprising an apparatus for the discharge of a capacitor, wherein the apparatus comprises:
   an active discharge circuit connectable in parallel with the capacitor; and
   an interface for providing a signal connection between a message-based communication system and the active discharge circuit,
   wherein the interface comprises at least one plurality of inputs for receiving messages from the message-based communication system,
   wherein the interface comprises a wake-up functionality,
   wherein the at least one input comprises an input for the wake-up functionality,
   wherein the interface is configured to:
      receive at the input for the wake-up functionality a disable discharge command message of said messages for the disabling of the discharge of the capacitor, and
      wherein upon cessation of the disable discharge command message, enable the discharge of the capacitor.

* * * * *